United States Patent [19]
Fischer et al.

[11] Patent Number: 4,930,619
[45] Date of Patent: Jun. 5, 1990

[54] APPARATUS FOR THE AUTOMATIC REPLACEMENT OF CONTAINER-RECEIVING PLATES OF A CONTAINER-FILLING MACHINE

[75] Inventors: Georg Fischer, Velbert; Wilhelm Propper, Langenfeld, both of Fed. Rep. of Germany

[73] Assignee: Benz & Hilgers GmbH, Dusseldorf, Fed. Rep. of Germany

[21] Appl. No.: 286,559

[22] Filed: Dec. 19, 1988

[30] Foreign Application Priority Data

Dec. 19, 1987 [DE] Fed. Rep. of Germany ....... 3743278

[51] Int. Cl.⁵ .............................................. B65G 17/38
[52] U.S. Cl. ............................ 198/803.2; 198/803.01; 198/346.1
[58] Field of Search ............... 198/346.1, 346.2, 465.1, 198/465.3, 803.01, 803.2; 29/33 P; 901/7, 40; 414/737, 752

[56] References Cited

U.S. PATENT DOCUMENTS

| | | | |
|---|---|---|---|
| 1,801,574 | 4/1931 | Schuldt | 198/803.01 |
| 2,397,698 | 4/1946 | Sigler et al. | 198/803.01 |
| 3,322,958 | 5/1967 | Heiss | 198/346.2 X |
| 3,952,860 | 4/1976 | Specht | 198/803.01 X |
| 4,482,043 | 11/1984 | Bauman et al. | 198/346.1 |
| 4,489,821 | 12/1984 | Inaba et al. | 198/346.1 X |
| 4,640,410 | 2/1987 | Palmaer et al. | 198/803.01 |
| 4,715,490 | 12/1987 | Date et al. | 198/346.1 |
| 4,718,349 | 1/1988 | Wahren | 198/803.01 X |
| 4,797,052 | 1/1989 | Ohta et al. | 198/346.1 X |

FOREIGN PATENT DOCUMENTS

3538993 4/1987 Fed. Rep. of Germany ... 198/465.1

*Primary Examiner*—Robert J. Spar
*Assistant Examiner*—James R. Bidwell
*Attorney, Agent, or Firm*—Herbert Dubno

[57] ABSTRACT

Cell plates of a machine for packaging into containers receivable in such cell plates, can be replaced utilizing a manipulator adapted to grip the cell plates and having pressing elements which operate upon axial couplings engageable with bolts of the conveyor in a screw-free manner.

8 Claims, 6 Drawing Sheets

APPARATUS FOR THE AUTOMATIC REPLACEMENT OF CONTAINER-RECEIVING PLATES OF A CONTAINER-FILLING MACHINE

SPECIFICATION

1. Field of the Invention

Our present invention relates to an apparatus for the automatic replacement of container-receiving plates, i.e. so-called cell plates, of a container-filling machine and, more particularly, to an assembly in such a machine for releasable retention, removal and replacement of the cell plates which are adapted to receive empty containers in respective cells or receivers to be filled.

2. Background of the Invention

Container-filling machines are provided in a wide variety of constructions and frequently comprise conveyors or transporters which can have cell plates affixed thereto.

A cell plate is defined as a plate which can be carried by conveyor or transporter and has at least one cell or receiver, e.g. a recess, hole or seat, in which a container can be positioned so that the container can be carried by the conveyor to a filling station in which a metered amount of a product to be packaged can be introduced into the upwardly open container at this station.

The conveyor can then carry the containers to a cover-applying station, to a station at which the closed containers are removed from their respective seats or receivers, etc. The containers may be paper, plastic or foil cups, e.g. for the packaging of daily products.

In general, the cell plates are connected to the transporter or conveyor by bolts or pins and in German patent No. 35 38 993, an arrangement is described for the automatic replacement of such cell plates in such machines or on such conveyors.

Generally speaking, the apparatus for the replacement of the cell plate, i.e. its removal from the conveyor and its return to the conveyor or the return of another cell plate (replacement) to the conveyor is effected by means of a manipulator provided with means engageable with the cell plate and referred to herein as a gripper.

This manipulator is, in the system described in the patent, equipped with a motor-driven tool for releasing the bolt connection between the cell plate and the conveyor by unscrewing this connection.

Naturally, replacement of the cell plate requires automatic reapplication of the threaded connector by a screw action.

In practice it has been found that the unscrewing of the bolts or nuts and the reapplication of such nuts, which are generally conventional hexagonal nuts, is time-consuming, relatively costly and can give rise to damage of the screw threads and hence interruption of the operation of the apparatus.

OBJECTS OF THE INVENTION

It is, therefore, the principal object of the present invention to provide an improved apparatus for automatically removing and replacing cell plates in container-filling machines of the type described whereby the aforementioned drawbacks are avoided.

Another object of the invention is to provide an apparatus, assembly or system for the automatic replacement of cell plates which ensures rapid release and retightening in place in conjunction with a trouble-free and rapid exchange or replacement of the cell plate.

SUMMARY OF THE INVENTION

These objects and others which will become apparent hereinafter are attained, in accordance with the present invention, by providing between the cell plate and the conveyor an axial rapid release and locking arrangement which is free from the need to unscrew threaded connections upon release and the need to screw threaded connectors together and simultaneously providing on the gripper plate proximal to the bolts or pins of the axial connection assembly between the cell plate and the conveyor, a mechanism operating free from rotation for the locking and unlocking of this assembly, also without a screwing action.

This combined locking and unlocking mechanism is so formed that upon replacement of the cell plate, the relative movement of the gripper plate and the cell plate to bring the gripper and gripper plate into engagement with the cell plate will automatically unlock the locking mechanism, independently of any screwing action so that an old cell plate can be placed by a cell plate of another format and will automatically be locked in place by retraction of the gripper plate therefrom.

This arrangement allows a trouble-free automatic operation which has been found to greatly accelerate cell-plate replacement without any danger that the connectors will be damaged as was frequently the case when a screw action was involved.

According to a further feature of this invention, the locking and unlocking mechanism comprises a locking sleeve connector engageable with the bolt or pin and provided with a pressing element which operates upon the locking element of the sleeve, the sleeve connector and pressing element being so arranged that upon relative movement of the gripper plate and the cell plate, the pressing element is automatically displaced to unlock the connection and upon replacement ensures relocking of the replacement cell plate.

It has been found to be advantageous to provide the bolt with a locking groove and to provide locking balls within the sleeve as the locking elements thereof. The pressing element can comprise a member axially shiftable within the sleeve against a spring force and braced against the balls so that relative displacement of the sleeve and the pressing element can be affected when the pressing element is engaged in a pincer or like retainer.

The locking sleeve, in that case, can have an annular groove receiving a gripper element which may also be mounted on the gripper plate to retain the sleeve against movement when the pressing element is actuated against the force of a compression spring. The latter may be accommodated in an annular clearance between the pressing element and the locking sleeve.

Because of this relative movement, the sleeve and the ball-receiving groove of the pin can be shifted relatively into a position in which the balls can move laterally outwardly and free the pin to permit separation of the cell plate from the conveyor on which the pin is provided.

The underside of the gripper plate turned toward the cell plate can be formed with a pusher engageable with the pressing element of the connection and this pusher can be a spring-loaded pin-like member surrounded by a pressure sleeve.

More specifically, the apparatus of the invention comprises:
  a conveyor;
  respective cell plates carried by the container and each formed with at least one receiver for a respective conveyor to be filled;
  a locking and unlocking mechanism, free from screwthread rotation, including a pin securing each of the cell plates to the conveyor; and
  a manipulator provided with a gripper plate, and means on the gripper plate engageable with a cell plate to be replaced for removing the respective cell plate from the conveyor and applying a replacement cell plate to the conveyor.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
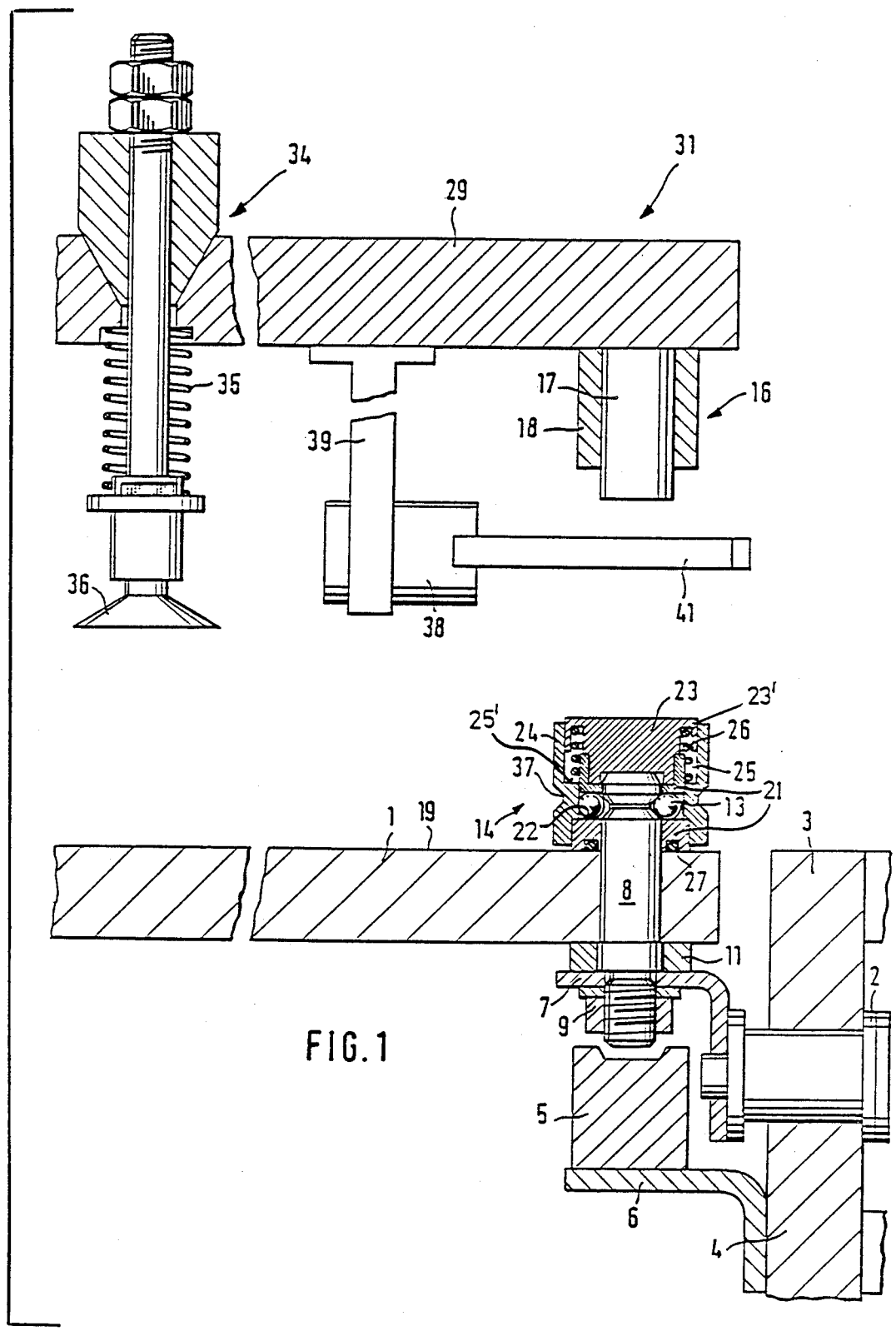
FIG. 1 is a view partially in section and partially in elevation illustrating the manipulator spaced from the cell plate in accordance with the principles of this invention.

In the apparatus shown in the drawing, which can be for a container-filling machine of any type utilizing cell plates, see for example the aforementioned German patent, the conveyor is constituted by a chain 2 and the cell plates 1 can be mounted upon this chain and may be replaced when the format of the filling machine is changed, e.g. when larger or smaller containers are to be filled. Only the right-hand side of the conveyor path has been shown in FIG. 1.

For precise guidance of the chain 2, upper and lower chain guides 3 and 4 are provided and a support rail 5 is mounted by brackets 6 upon the lower guide 4 to carry the load of the cell plates and conveyors in the event of the development of slack in the chain.

At appropriate locations along the chain, angle brackets 7 are provided on respective links and these angle brackets have bolts 8 fitted to them and attached by respective nuts 9.

Each of the bolts or pins 8 can have a washer or flange 11 affixed thereto and can have, at an end opposite the flange 11, a circumferential locking groove 12.

According to the invention, locking balls 13 can engage in the groove 12. The locking balls 13 form part of an axial rapid-connection coupling 14 which forms part of the locking and unlocking mechanism 15.

This locking and unlocking mechanism comprises, in addition to the aforementioned axial coupling 14, a pressing member 16 which is formed on a gripper plate 29 of a manipulator of which only part has been shown in the drawing.

The pressing member 16 comprises a pin-like element 17 which can be composed of a resiliently compressible material, such as rubber, and is retained in a pressure sleeve 18 of metal.

The coupling 14 has at its side turned toward the upper face 19 of the cell plate 1, a support body 21 with radial bores 22 to receive the balls 13 and which can be provided with means (not shown) to prevent the balls from falling inwardly out of these bores.

Figure 6:
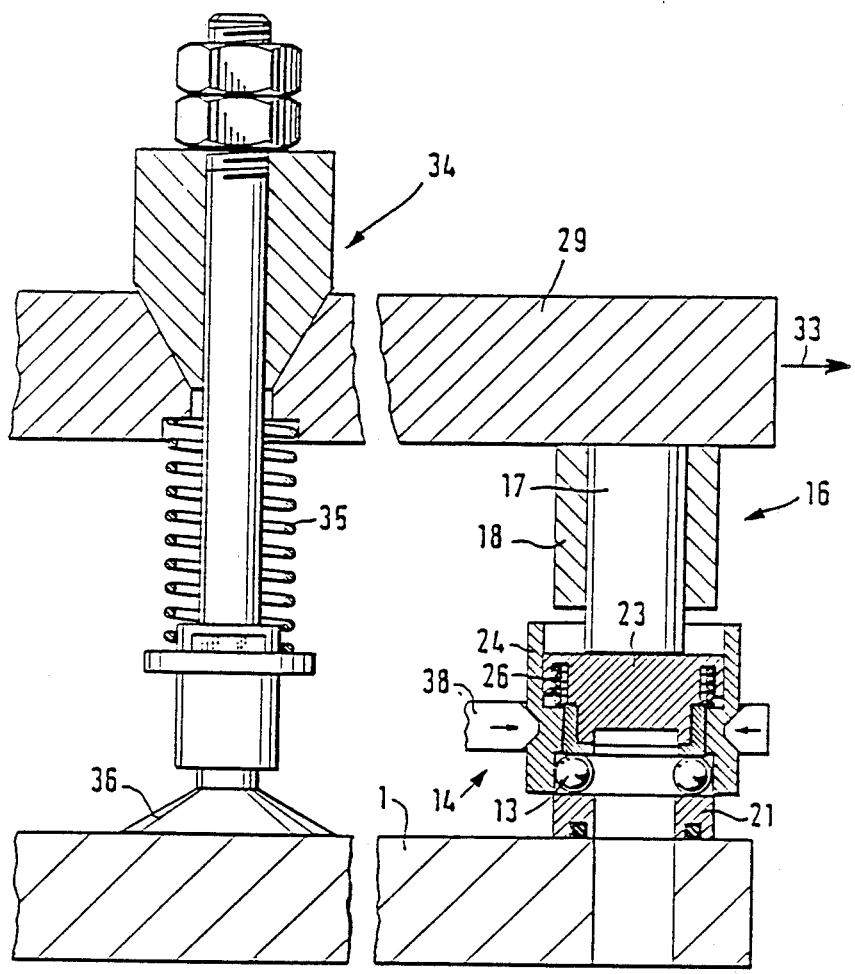
FIG. 6 is a similar view showing the apparatus in a position in which the cell plate has been removed from the conveyor.
Figure 6:
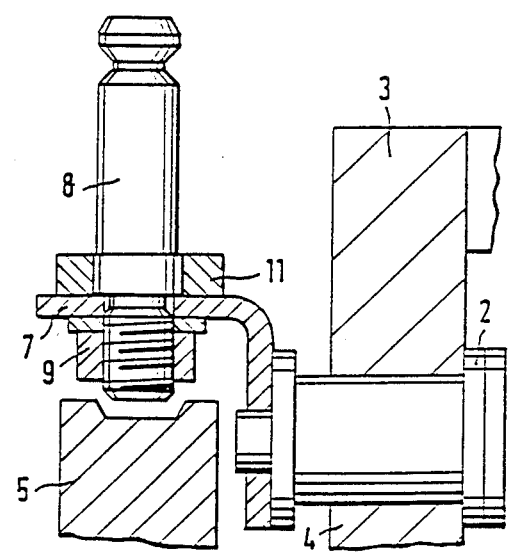

The locking sleeve 24 also surrounds a central member 23 of the coupling so that the members 23 and 24 can axially shift relative to one another as a comparison of FIG. 1 with FIG. 6 will show.

Between the locking sleeve 24 and the central pressing element 23, a spring chamber 25 is provided in which a compression spring 26 is arranged, the compression spring 26 bearing at one end against a shoulder 25' of the locking sleeve 24 and at its other end against collar 23' of element 23.

Between the face 19 of the cell plate 1 and the support body 21, an O-ring 27 is provided to compensate for manufacturing tolerances.

Figure 2:
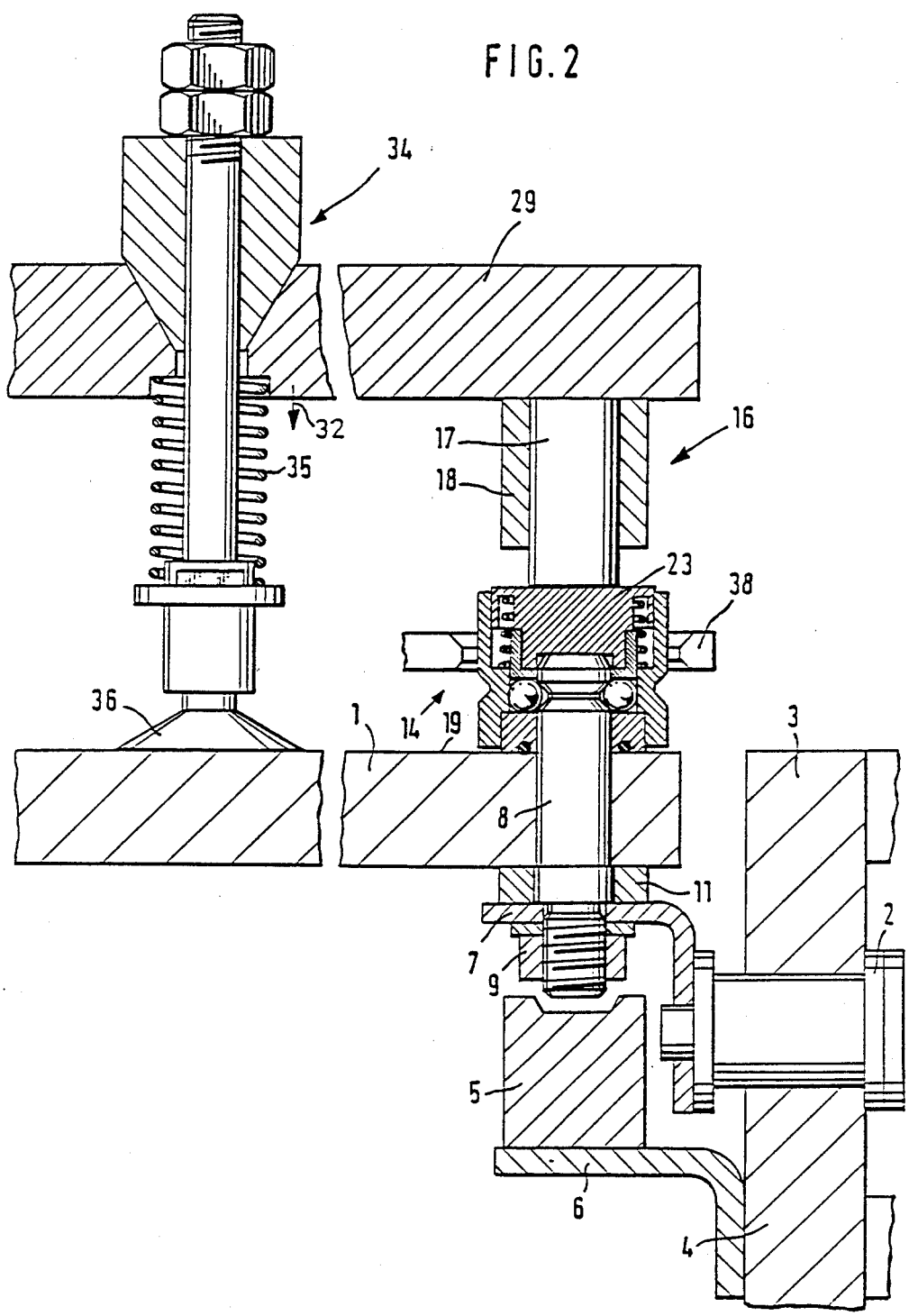
FIG. 2 is a similar view showing a first step in the unlocking of the mechanism and removal of the cell plate.
Figure 3:
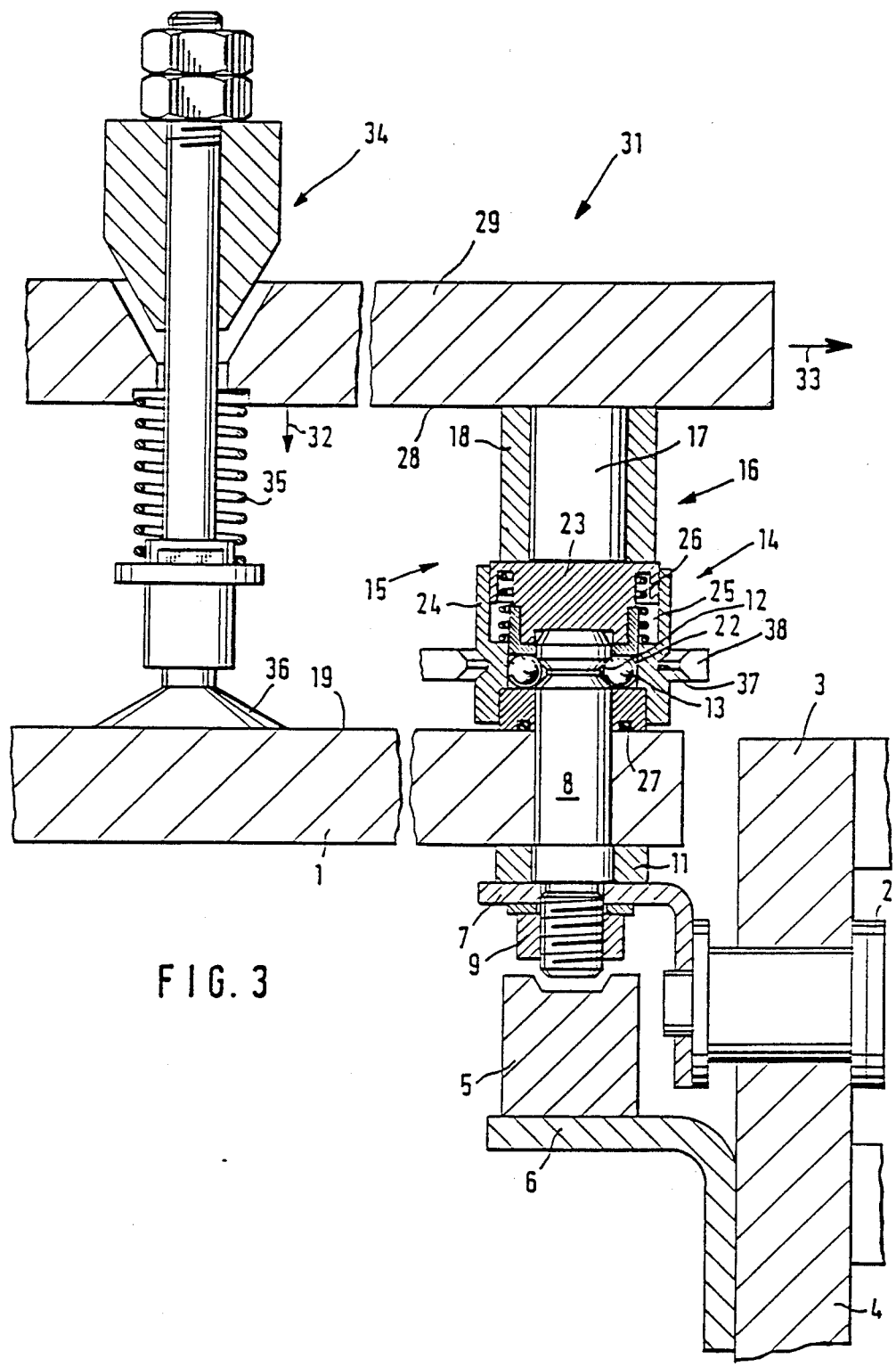
FIG. 3 is a similar view showing the second stage of the process.

The pressing element 16, as has been noted, is mounted on the underside 28 of the gripper plate 29 of the manipulator 31 which has not been shown in greater detail but is capable of the movements necessary to withdraw a cell plate from the machine and replace it with a cell plate of another format. The manipulator can be moved in the direction of arrow 32 (FIG. 2) and in the direction of arrow 33 (FIG. 3) for this purpose and, of course, in the opposite direction.

The gripper plate 29 is also equipped with gripper elements 34 of which only one is visible in FIG. 1 and the remaining Figures but can be of conventional design and are capable of engaging the cell plate, withdrawing it from the pins 8, depositing it, picking up a cell plate of a different format and transferring it to the conveyor.

The gripper elements 34 each comprise a compression spring 35 urging a suction head 36 toward the cell plate 19.

In the outer periphery of the locking sleeve 34, an annular groove 37 is formed in which a retaining or gripper element 21, for example a pincer, can engage, this pincer being mounted at 39 on the underside of the gripper plate 29 of the manipulator. The cell plate replacement operation is carried out as follows.

As can be seen from FIG. 1, the cell plate 1 is located by the axial-release closure 14 to the pins 8 of the conveyor 2 of the container-filling machine. The manipulator 31 with its gripper plate 29 and suction heads 36 and pressing elements 16 aligned with the members 23 of the axial actuatable closures 14 can be brought into position above the cell plate to be replaced as is apparent from FIG. 1.

Movement of the gripper plate 31 in the direction of arrow 32 (FIG. 2) causes the suction head 36 to engage the surface 19 of the cell plate and the member 17 of pressing element 16 to bear against the central coupling element 23 of the axially actuated coupling 14.

Figure 4:
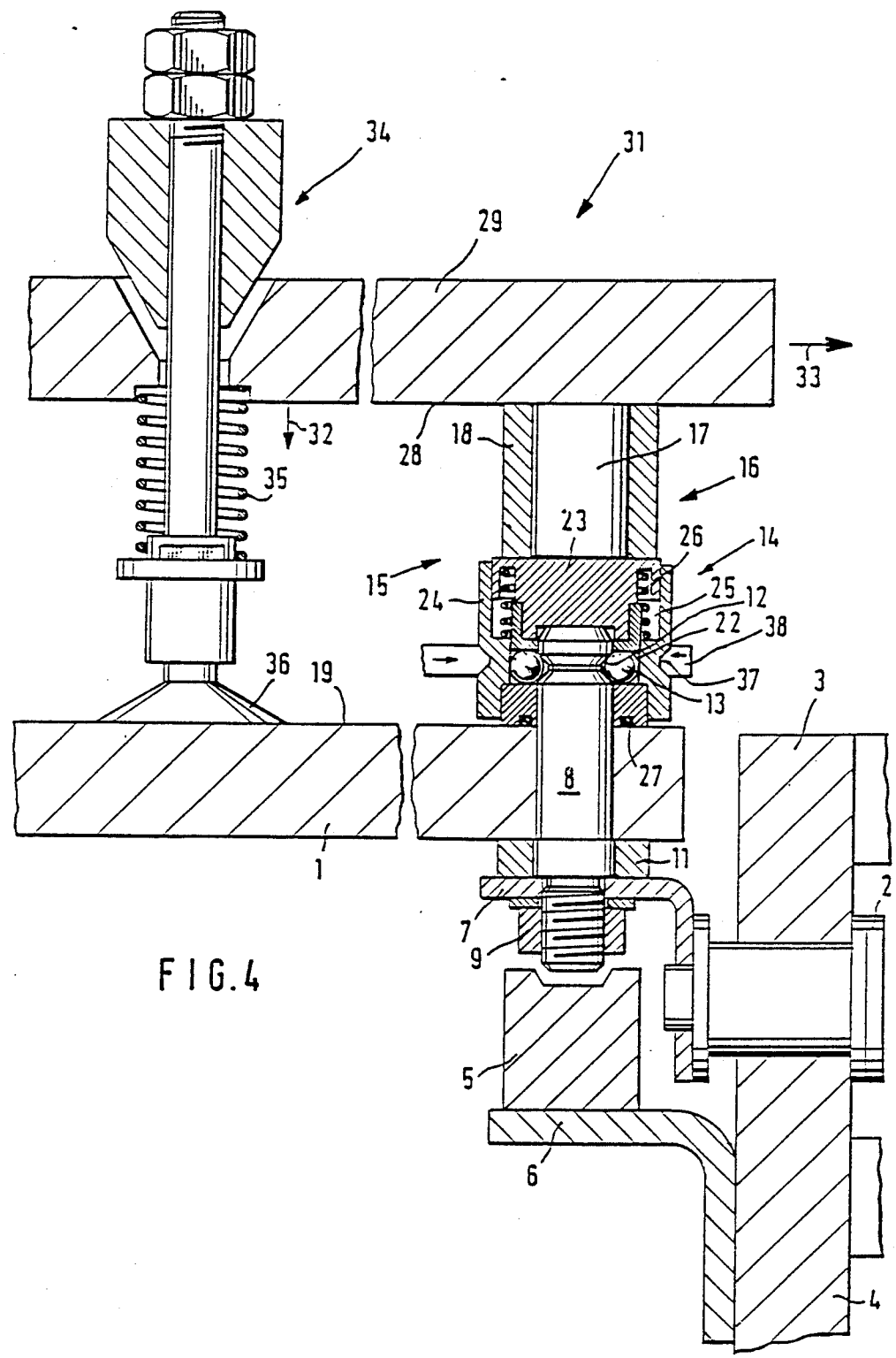
FIG. 4 is a sectional view showing a third stage thereof.

With further lowering of the gripper plate 29 until the pressure sleeve 18 bears against the center coupling element 23 (FIG. 3) the pincer 38 can engage in the groove 37 and can be closed on the sleeve 24 (see FIG. 4 in which the pincer element has been rotated through 90° by comparison with FIG. 1 for greater understanding). The locking sleeve 24 is thereby held in a fixed position with respect to the gripper plate 29.

Figure 5:
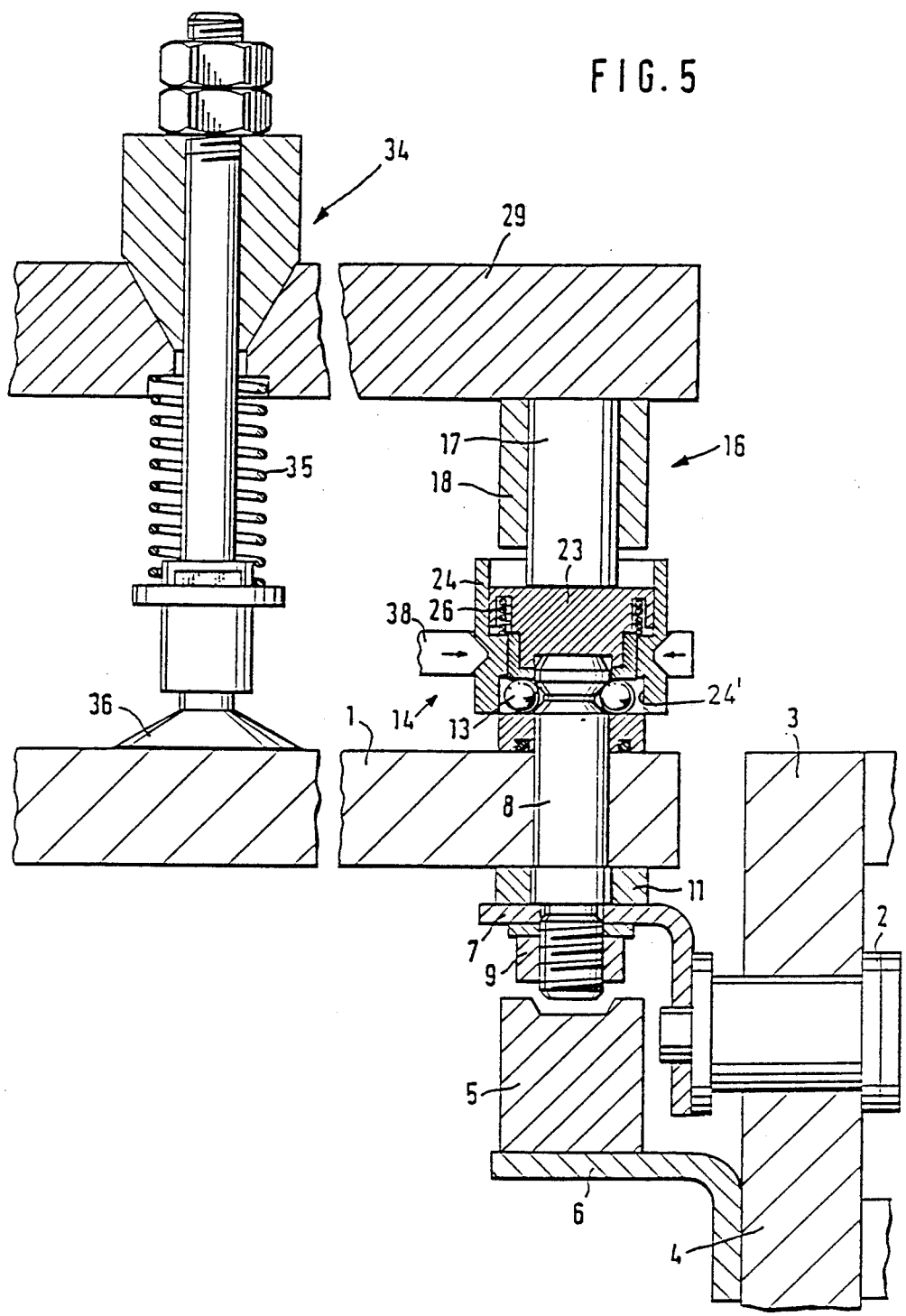
FIG. 5 is a partial section and partial elevation showing a fourth stage in the process for releasing the locked connection and removal of a cell plate.

As can be seen from FIG. 5, the gripper plate is then permitted to move upwardly by a distance equal to the previously compressed distances of the spring 35 and the member 17. As a consequence, the gripper element 38 draws the sleeve 24 upwardly to permit the balls 13 to pass into the larger diameter space 24' of the sleeve 24, i.e. to move radially outwardly and release the bolt 8.

The manipulator 31 can then withdraw the cell plate 1 (FIG. 6) and carry it via the suction heads 36, in the direction of arrow 33. The cell plate can then be deposited in a storage magazine while a plate of different format is drawn from this magazine and carried by the suction heads 36 back into alignment with the bolts 8.

The gripper plate 29 can then lower the new cell plate from the position shown in FIG. 6 into its lowered positions as shown in FIGS. 4 and 5. The gripper element 38 is then released and the gripper plate 29 retracted after the suction in heads 36 has been cut off.

The spring 26 ensures return of the sleeve 24 to its locking position to retain the cell plate until the next replacement operation. The lateral displacement of cell plates for exchange purpose has been described in the foregoing German patent.

We claim:

1. In a container-filling machine, an apparatus which comprises in combination:
    a conveyor;
    a plurality of cell plates carried by said conveyor and each formed with at least one receiver for respective container to be filled;
    a manipulator provided with a gripper plate, and means on said gripper plate engageable with a cell plate to be replaced for removing the respective cell plate from said conveyor and applying a replacement cell plate to said conveyor; and
    a locking and unlocking mechanism, free from screwthread rotation, including a pin securing each of said cell plates to said conveyor, an axial actuatable coupling member engageable with said pin, and a pressing element on said gripper plate positioned to axially actuate said coupling member.

2. In a container-filling machine, an apparatus which comprises in combination:
    a conveyor;
    a plurality of cell plates carried by said conveyor and each formed with at least one receiver for a respective container to be filled;
    a manipulator provided with a gripper plate, and means on said gripper plate engageable with a cell plate to be replaced for removing the respective cell plate from said conveyor and applying a replacement cell plate to said conveyor; and
    a locking and unlocking mechanism, free from screwthread rotation, including a pin securing each of said cell plates to said conveyor, an axial actuatable coupling member engageable with said pin, a pressing element on said gripper plate positioned to axially actuate said coupling member, a circumferential groove formed in said pin, a plurality of locking balls received in said groove, a support member surrounding said pin and supporting said balls, a locking sleeve surrounding said balls and normally retaining said balls in said groove, said locking sleeve receiving said support member and being displaceable axially relative to said pin, a central member axially displaceable relative to said sleeve and adapted to bear against said pin upon engagement by said pressing element to enable disengagement of said cell plate from said pin, and a compression spring braced between said central member and said sleeve.

3. The apparatus defined in claim 2 wherein said locking and unlocking mechanism includes a further circumferential groove formed in said sleeve, said gripper plate being formed with a pincer engageable in said further groove to axially retain said sleeve while pressure is applied to said mechanism by said pressing element.

4. The apparatus defined in claim 3 wherein said pressing element is formed on an underside of said gripper plate and comprises an axially yieldable member and a pressing sleeve surrounding said axially yieldable member.

5. The apparatus defined in claim 3 wherein said means on said gripper plate include a suction device yieldably connected to said gripper plate for seizing said one of said cell plates.

6. The apparatus defined in claim 5 wherein said suction device is spring-loaded in the direction of said gripper plate.

7. The apparatus defined in claim 4 wherein said means on said gripper plate include a suction device yieldably connected to said gripper plate for seizing said one of said cell plates.

8. The apparatus defined in claim 7 wherein said suction device is spring-loaded in the direction of said gripper plate.

* * * * *